US 6,565,045 B1

(12) United States Patent
Correge et al.

(10) Patent No.: US 6,565,045 B1
(45) Date of Patent: May 20, 2003

(54) AIRCRAFT AERODYNAMIC SURFACE WITH TRAILING EDGE DEFLECTOR

(75) Inventors: Michel Correge, Toulouse (FR); André Mignosi, Toulouse (FR); Daniel Caruana, Fonsorbes (FR); Jean-Louis Gobert, Toulouse (FR)

(73) Assignee: Onera, Chatillon (FR)

( * ) Notice: Subject to any disclaimer, the term of this patent is extended or adjusted under 35 U.S.C. 154(b) by 0 days.

(21) Appl. No.: 09/958,356
(22) PCT Filed: Apr. 6, 2000
(86) PCT No.: PCT/FR00/00864
§ 371 (c)(1), (2), (4) Date: Mar. 27, 2002
(87) PCT Pub. No.: WO00/63071
PCT Pub. Date: Oct. 26, 2000

(30) Foreign Application Priority Data

Apr. 16, 1999 (FR) .............................. 99 04777

(51) Int. Cl.⁷ ...................... B64C 3/50; B64C 21/00
(52) U.S. Cl. ................... 244/215; 244/75 A; 244/212
(58) Field of Search ............... 244/75 A, 76 C, 244/217, 198, 203, 212, 215

(56) References Cited

U.S. PATENT DOCUMENTS

| 2,034,218 A | * | 3/1936 | Weick et al. ............... 244/212 |
| 2,136,845 A | * | 11/1938 | Fenton ...................... 244/90 R |
| 2,257,215 A | * | 9/1941 | Zap ............................. 244/215 |
| 4,867,396 A | | 9/1989 | Wainfan ...................... 244/215 |
| 5,294,080 A | | 3/1994 | Ross ............................. 244/215 |

FOREIGN PATENT DOCUMENTS

| EP | 0260586 | 3/1988 |
| EP | 0615903 A1 | 9/1994 |
| FR | 2531676 | 2/1984 |

* cited by examiner

Primary Examiner—Robert P. Swiatek
(74) Attorney, Agent, or Firm—Stevens, Davis, Miller & Mosher, LLP

(57) ABSTRACT

An aerodynamic surface, such as a wing, empennage, angle of drift, nacelle pylon and the like for an aircraft includes at least one lightening hole pertaining to the trailing edge of the underwing, at least one hinged baffle that can be mounted in the lightening hole of the underwing, whereby the chord thereof is equal to a several hundredths of the chord of the aerodynamic surfacer and an actuator for the moveable baffle so that it can rotate around the hinge line.

11 Claims, 6 Drawing Sheets

AIRCRAFT AERODYNAMIC SURFACE WITH TRAILING EDGE DEFLECTOR

The present invention relates to an aircraft aerodynamic surface such as an airplane wing, a vertical stabilizer, an empennage, a fairing, an engine nacelle pylon, etc., equipped with at least one trailing edge deflector.

Document U.S. Pat. No. 4,867,396 already discloses an aerodynamic surface, more specifically an airplane wing, the lift and drag of which are respectively increased and reduced by virtue of a deflector, known as a microflap, arranged at the trailing edge of said aerodynamic surface, inclined with respect to the pressure face thereof. This deflector is fixed and so is its inclination with respect to said pressure face, it being possible for the angle of inclination between said deflector and the chord of the aerodynamic surface to be chosen from several values, for example 20°. In addition, the chord of said deflector is short by comparison with that of the aerodynamic surface, the ratio of said chords being between 0.5% and 1.5%.

Furthermore, it is known that the wing structures of airplanes may be subjected, to a phenomenon of fluttering, generally known as "buffeting". This phenomenon is the result of unsteady or turbulent separation of the airflow originating on the reduced-pressure face of the wing structure and, through a coupling effect, giving rise to vibration of the structure. This buffeting may occur at any speed of flight of an airplane and is accentuated at transsonic speeds by the fluctuations of the shock wave brought about by the turbulent separation.

In order to combat buffeting, thought has already turned to the use of the customary trailing edge moving flaps designed for controlling airplanes as described, for example, in Patents FR2,531,676 and U.S. Pat. No. 4,705,902. What happens is that such trailing edge flaps have a reduced-pressure face and a pressure face which respectively extend the reduced-pressure face and the pressure face of the aerodynamic surfaces to the rear of which they are articulated. Thus, when they are turned, they locally modify the curvature of both the reduced-pressure face and the pressure face of said aerodynamic surface.

However, it has been found that when the buffeting was combated using trailing edge flaps, there was a risk of the flow separated from the reduced-pressure face of the aerodynamic surface reattaching to the reduced-pressure face of the turned flap, making the airplane difficult to control. In addition, combating buffeting using trailing edge flaps, the usual and specific function of which is to play a part in controlling the aircraft, is not without difficulties.

Hence, it is an object of the present invention to eliminate, or at the very least to reduce, the buffeting of the aerodynamic surfaces that occurs essentially in transsonic flight while at the same time making it possible to improve the aerodynamic characteristics of these surfaces. To do this, the invention relates to a system with deflector likenable to the one described in document U.S. Pat. No. 4,867,396, briefly analyzed hereinabove, and making it possible to improve said characteristics and to combat buffeting by the static or dynamic turning of said deflector.

To this end, according to the invention, the aircraft aerodynamic surface comprising:
  a reduced-pressure face and a pressure face which are connected together, at the front, by a leading edge and, at the rear, by a trailing edge base, the extreme rear section of which forms the trailing edge of said aerodynamic surface; and
  at least one deflector intended to improve the aerodynamic performance of said aerodynamic surface, the chord of said deflector being equal to a few hundredths of the chord of said aerodynamic surface and said deflector being arranged to the rear thereof, is noteworthy in that:
  said deflector can move and is housed in a recess made in the thickness of the pressure face of said trailing edge base and opening into said trailing edge so that the rear edge of said base consists of a reduced-thickness part of said trailing edge;
  said moving deflector is articulated, via its front part, about an axis at least essentially parallel to said trailing edge so as to be able to pivot about said axis of articulation under the action of actuating means; and
  said moving deflector can adopt:
    either a retracted extreme position, for which said deflector is fully housed in said pressure face recess ensuring the continuity of said pressure face, the rear edge of said deflector then collaborating with said rear edge of said base to form said trailing edge;
    or any one of a number of deployed positions, for which said deflector is turned with its rear part projecting from said pressure face recess, thus giving the trailing edge of said aerodynamic surface a parameterizable variable thickness.

Thus, when a short-chord deflector such as this is in the retracted position, no modification is made either to the reduced-pressure face or to the pressure face of the aerodynamic surface, whereas in the turned position, said pressure face alone is modified. When said deflector is in such a turned position, the geometry of the reduced-pressure face of the aerodynamic surface remains unchanged, the aerodynamic performance thereof being improved through the modification to the thickness and the divergence of the trailing edge, something which, incidentally, delays the onset of buffeting.

The deflector or deflectors according to the present invention may be operated mechanically, electrically, pneumatically or hydraulically.

According to a first method of operation, the deflector or deflectors may be placed in a fixed position with an angular turning of adjustable determined value. This then is static turning, similar to that of document U.S. Pat. No. 4,867,396, which creates a difference in pressure at the trailing edge between the pressure face and the reduced-pressure face, which increases the rear load on said aerodynamic surface by modifying the thickness and divergence of the trailing edge. Hence:
  for a fixed Mach number and fixed incidence, the turning of the deflector causes the mean position of the aerodynamic shock to move back toward the trailing edge and causes an increase in the rear load, which generates an appreciable increase in the coefficient of lift;
  for a given Mach number and a given coefficient of lift (cruising flight), the aerodynamic performance of the aerodynamic surface is enhanced, with a reduction in drag.

As an alternative, the deflector or deflectors may be given a movement about a mean position of turning. This then is dynamic operation which can cause the deflector or deflectors to fluctuate at a frequency of between a few Hz and a few kHz.

The buffeting can thus be controlled, with or without a shock wave, actively, the deflector turn law being deduced directly at every moment from the level of separation or from the position of the shock.

The site of separation and the position of the shock under transsonic conditions are preferably identified using unsteady-state pressure measurements. They may also be obtained by other means, such as friction probes, parietal hot films, etc. Processing these data makes it possible, at any instant, to locate the levels of intensity of the separation or the position of the shock.

As soon as the unsteady-state sensors arranged along the aerodynamic surface detect the onset of instability, the closed-loop active dynamic control comes into effect. Buffeting is thus dealt with as soon as aerodynamic instabilities occur, before it has been able to excite the natural modes of the structure.

In addition to the unsteady-state pressure measurements, the ensuing vibration may be taken into consideration by strain gauges and/or accelerometers and may be introduced into the control law for the deflectors, so as to improve the overall performance.

In order to be active, the deflector of the invention does not need to have a long chord. Significant results have been obtained with deflectors the chord of which is, for example, at most equal to three hundredths of the chord of said aerodynamic surface.

Furthermore, when said deflector is in the retracted extreme position, the rear edge thereof may be aligned with the rear edge of said trailing edge base. As an alternative, in this position, the rear edge of the deflector could project with respect to the rear edge of said trailing edge base.

Said aerodynamic surface may comprise a single deflector extending over its entire span or, at the very least, over most of this span. As an alternative, it may comprise one or more deflectors of limited span, arranged at the points where the unsteady phenomena (separation or shock fluctuation) occur and are the most intense. The various deflectors may be operated jointly or independently.

It will be noted that, in the present invention, the expression "trailing edge" is to be understood, like in Patent U.S. Pat. No. 4,867,396, as meaning the trailing edge of the entirety of the aerodynamic surface concerned, that is to say of the overall surface. Thus, when the aerodynamic surface comprises trailing edge flaps, the trailing edge to which the present invention relates, in the region of these flaps, is that of said flaps. In the case of a wing in transsonic flight, the trailing edge concerned may be made up of trailing edges of fixed elements (for example the wing) and trailing edges of moving elements (for example flaps). A deflector according to the invention cannot be located between two elements which face one another along the chord, such as, for example, at the trailing edge of a fixed main element facing a lift-enhancing moving element, such a trailing edge playing no part in forming the overall trailing edge of the aerodynamic surface.

This said, it will be noted that Patent U.S. Pat. No. 5,294,080 discloses a wing comprising a fixed main element and a lift-enhancing moving element intended to increase the lift of the wing in the low-speed phases of flight. This document teaches that the lift of such a wing can be increased by introducing a moving deflector between the two elements of the wing. This moving deflector operates in all or nothing mode. In the phases of flight at transsonic speed, the lift-enhancing element is incorporated into the camber of the fixed main element of the wing structure and the deflector is therefore retracted into the main element: it has no function. In low-speed phases of flight, this deflector is deployed into a position perpendicular to the pressure face of the trailing edge of the fixed main element: the deflector alters the distribution of the flow between the pressure face and the reduced-pressure face of the moving element.

It will also be noted that the function of the deflector of the present invention is not to enhance the lift during the corresponding phases of flight, take-off and landing.

The figures of the appended drawing will make it easy to understand how the invention may be embodied. In these figures, identical references denote elements which are similar.

Figure 1:
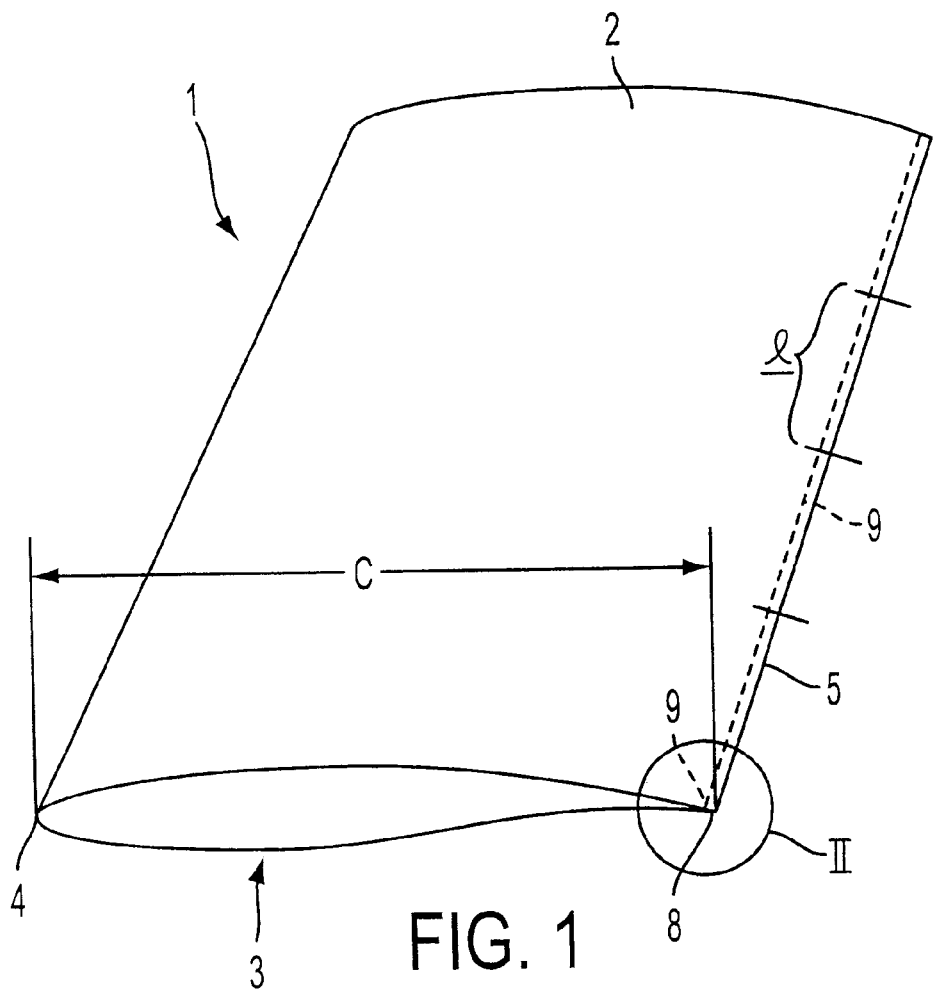
FIG. 1 shows, schematically, in perspective and from above, a portion of an airplane wing according to the present invention.

The airplane wing portion 1 shown in FIG. 1 comprises a reduced-pressure face 2 and a pressure face 3 connected to one another, at the front, by a leading edge 4 and, at the rear, by a trailing edge 5.

Figure 2:
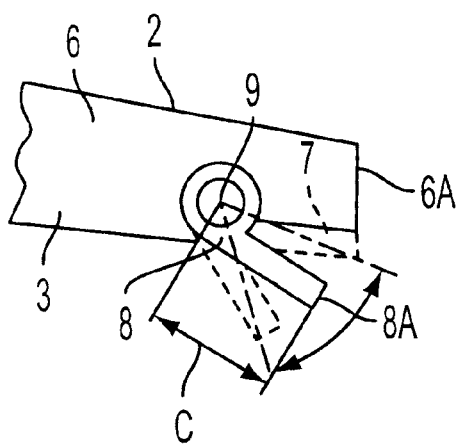
FIG. 2 illustrates, on a larger scale, detail II of FIG. 1.

As can be seen on a larger scale in FIG. 2, the reduced-pressure face 2 and the pressure face 3 converge toward one another toward the rear to form a trailing edge base 6. This base 6 has at least one recess 7 made only in the thickness of the pressure face 3, forward of said trailing edge and extending as far as the latter. Thus, the rear edge 6A of the base 6 consists of a reduced-thickness part of the trailing edge 5.

Figure 5:
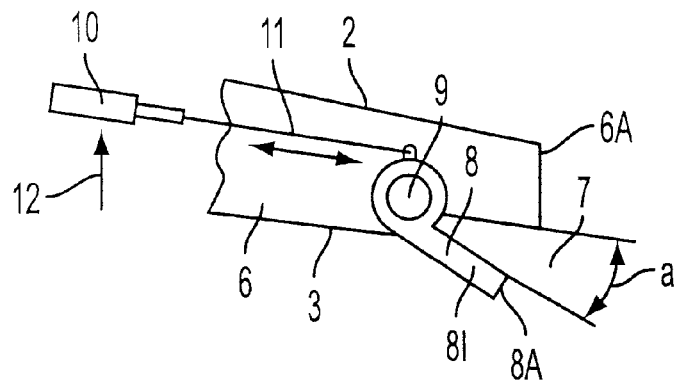
FIG. 5 illustrates static means for the operation of the deflector according to the present invention.

Arranged in the pressure face recess 7 is at least one moving deflector 8, articulated by its front part about an axis 9 at least essentially parallel to the trailing edge 5. As is illustrated in FIG. 1, the chord c of the deflector 8 is small by comparison with the chord C of the profile of the wing 1. The chord c of the deflector 8 is equal to a few hundredths, for example at most equal to three hundredths, of the chord C of the wing 1. The deflector 8 (see FIG. 2) may, by rotating about the axis 9, adopt:

either a retracted extreme position 8R (see also FIG. 3), for which the deflector 8 is fully housed in the pressure face recess 7, ensuring the continuity of the pressure face 3;

or any one of a number of deployed positions 8I (one of which is illustrated in FIG. 5), for which said deflector 8 is turned with its rear part projecting out from said pressure face recess 7.

Figure 4:
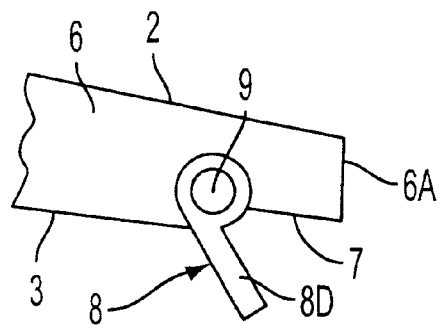

FIG. 4 depicts the deflector 8 in the deployed extreme position 8D.

It can be seen that, in the retracted extreme position 8R (FIG. 3), the rear edge BA of the deflector 8 collaborates with the rear edge 6A of the base 6 to form the trailing edge 5, the rear edge 8A of the deflector 8 being aligned with the rear edge 6A of the trailing edge base 6.

Figure 3:
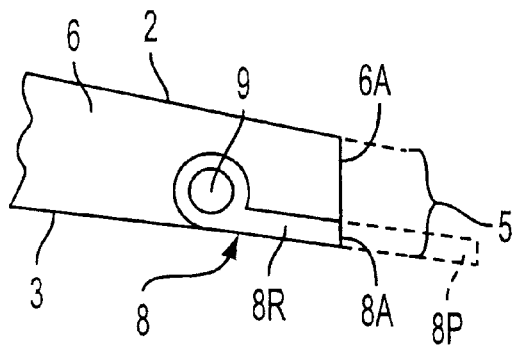
FIGS. 3 and 4 illustrate the deflector of the wing of FIG. 1 in the retracted extreme position and in the deployed extreme position, respectively.

However, as depicted in dotted line in FIG. 3, the chord c of the deflector 8 may be long enough (while at the same time remaining short by comparison with the chord C of the wing 1) for the rear edge 8A of said deflector to project, when said deflector is in the retracted position, with respect to the rear edge 6A of the trailing edge base 6.

In terms of span, the deflector 8 may extend over the entire span of the wing 1, that is to say over the entire length of the trailing edge 5. However, as illustrated in dotted line in FIG. 1, the wing 1 may comprise one or more deflectors 8 of limited length l with respect to the span of the wing 1.

To actuate each deflector 8, an actuator 10 may be provided which is connected to said deflector 8 by a linkage 11 and which receives operating commands via a link 12.

Figure 6:
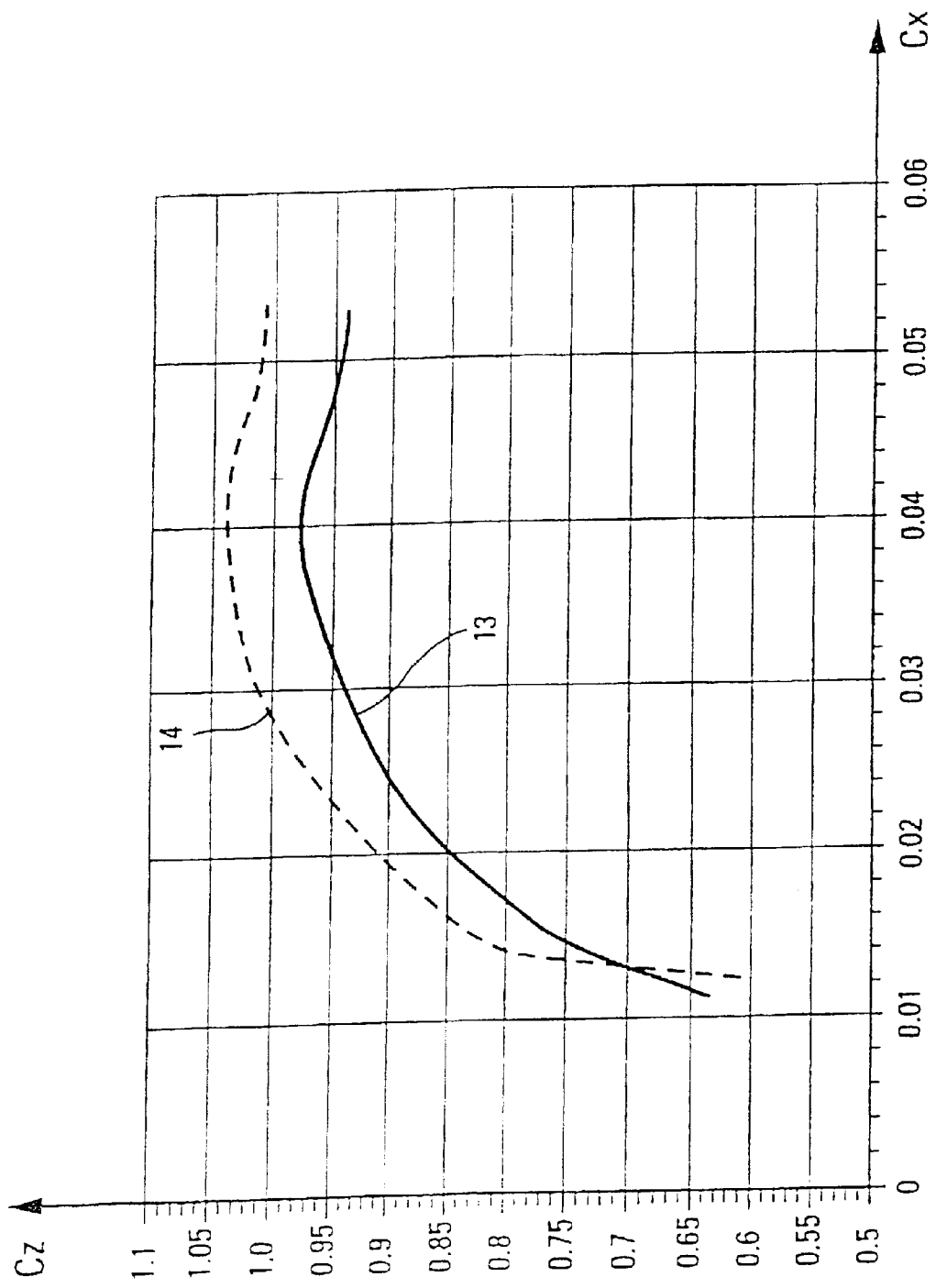
FIG. 6 is a comparative diagram illustrating the airfoil characteristics of the wing of FIG. 1, the deflector being in the retracted extreme position and in the position turned through 15°, respectively.
Figure 9:
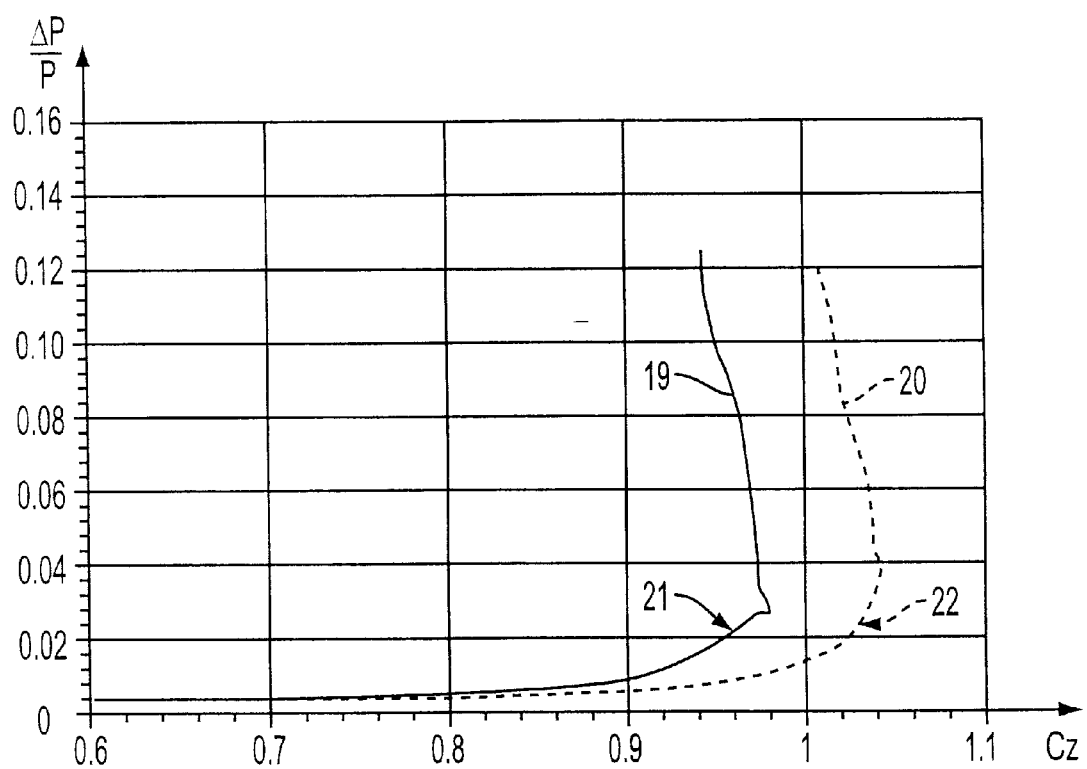
FIG. 9 is a comparative diagram illustrating the effect of the turning of the deflector according to the invention on the onset of buffeting.

FIG. 6 depicts the airfoil characteristics 13 of the wing 1, when the deflector 8 is in the retracted extreme position 8R of FIG. 3, and the airfoil characteristics 14 of said wing when the deflector 8 is turned through an angle a (see FIG. 5) equal to 15°. With such static turning, the deflector 8 creates a pressure difference at the trailing edge 5 between the pressure face 3 and the reduced-pressure face 2, which leads to an increase in the rear load on the wing 1 by modifying the thickness and the divergence of the trailing edge 5. This also causes a setback in the onset of buffeting, as illustrated in FIG. 9 which depicts the pressure fluctuations $\Delta P/P$ at a point on the reduced-pressure face of the aerodynamic surface 1 as a function of the coefficient of lift Cz, the curve 19 corresponding to an angle a equal to 0° and the curve 20 to an angle a equal to 15°. In curves 19 and 20, the onsets of buffeting are denoted by the arrows 21 and 22 respectively. FIG. 9 illustrates the appreciable increase in the coefficient of lift of the profile considered for a turning of 15°, for a fixed Mach number and a fixed incidence.

Curves 13 and 14 in FIG. 6 illustrate the increase in lift and/or the decrease in drag brought about by the deflector 8.

Figure 7:
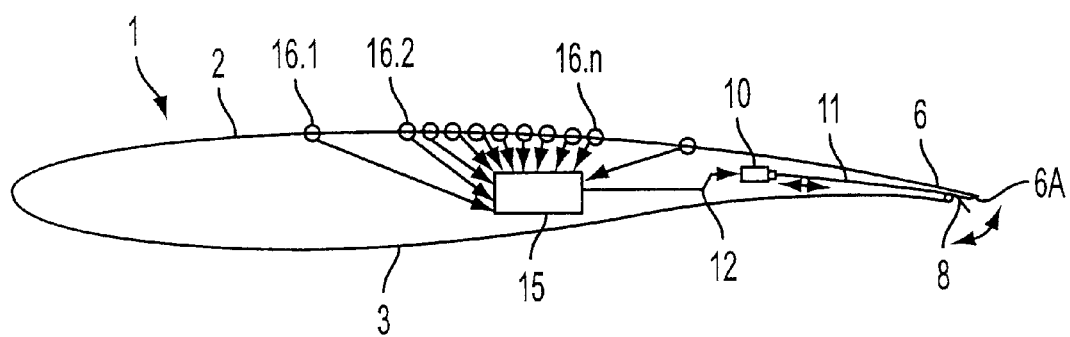
FIG. 7 is a schematic view illustrating means for the active dynamic operation of the deflector according to the present invention.

FIG. 7 again shows the wing 1, the deflector 8, the actuator 10, the linkage 11 and the operating link 12. However, in this instance, the actuator 11 receives, via the link 12, dynamic operating commands from a device 15 comprising a computer and which itself receives information from a number of sensors 16.1, 16.2, . . . , 16.n spread along the reduced-pressure face 2 of the wing 1. These sensors 16.1 to 16.n which are, for example, pressure tappings, make it possible to identify, along the reduced-pressure face 2, the level of turbulent separation of the flow, and the position of the shock under transsonic conditions, so that the computer of the device 15 can calculate the turn angle a to be applied to the deflector 8.

The device 15 turns the deflector 8, at every moment, as a function of the level of turbulent separation of the flow and of the position of the shock, for example in a fluctuating manner.

As soon as the sensors 16.1 to 16.n detect the onset of flow instabilities, the active control device 15 acts on the deflector via the actuator 10 and the linkage 11. The buffeting is thus dealt with as soon as aerodynamic instabilities occur, before it has been able to excite the natural modes of the wing 1.

Figure 8:
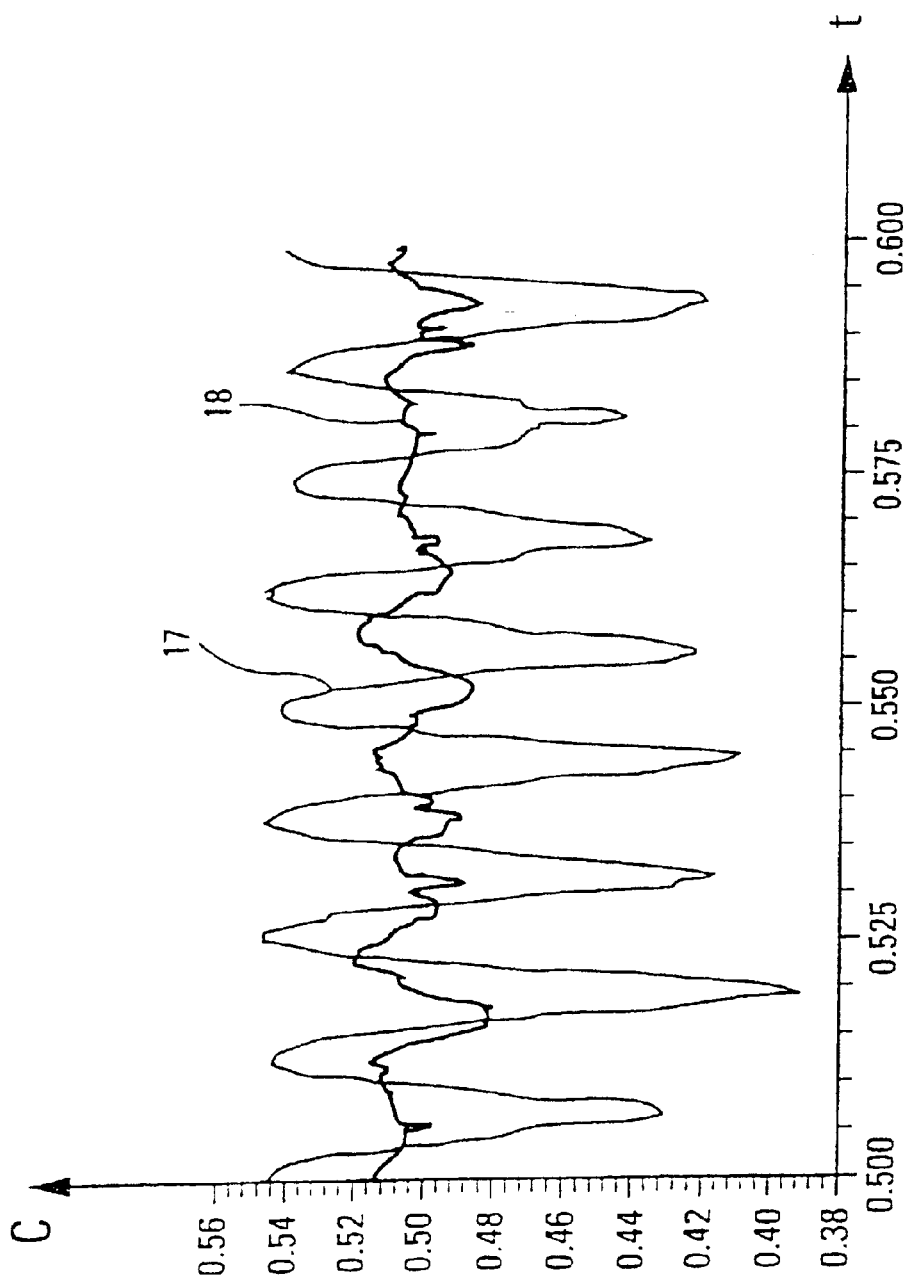
FIG. 8 illustrates the action of the deflector of FIG. 7 and of its operating means, in the event of buffeting.

Illustrated in FIG. 8 in a diagram, the y-axis of which gives a normalized position with respect to the chord C of the wing 1 and the x-axis of which gives the time t, is the influence of the action of the deflector 8 operated dynamically by the device 15 and the sensors 16.1 to 16.n. In this FIG. 8, the curve 17 represents the amplitude of the instabilities in the flow over the wing 1, in the absence of operation of the deflector 8, and the curve 18 represents this same amplitude with the instabilities controlled via the deflector 8.

It will be readily understood from the foregoing that the deflector or deflectors 8 could just as easily be used as an aid to controlling the aircraft comprising the wing 1, or for reducing, in this aircraft:

aerodynamic instabilities due to separation in the low-speed domain, without shock waves, and instabilities due to atmospheric turbulence.

Furthermore, it will be understood that, instead of being applied to an airplane wing as has just been described hereinabove and illustrated in the drawings, the deflector 8 could be provided in the pressure face of the trailing edge of any other aerodynamic surface such as the profiled pylon of an engine nacelle, for example. It goes without saying that such a deflector, associated with such a pylon, could reduce local instabilities due to separation with or without shock waves, in the environs of said pylon.

What is claimed is:

1. An aircraft aerodynamic surface comprising a reduced-pressure face and a pressure face which are connected together, at the front, by a leading edge and, at the rear, by a trailing edge, and at least one moving deflector articulated via its front part about an axis at least essentially parallel to said trailing edge so as to be able to pivot about said axis of articulation under the action of actuating means, wherein:

a chord of said at least one deflector is equal to a few hundredths of a chord of said aerodynamic surface;

said at least one moving deflector is housed in a recess made in the thickness of said pressure face, forward of said trailing edge and extending as far as the latter, and said at least one deflector can adopt:

either a retracted extreme position, for which said at least one deflector is fully housed in said pressure face recess, ensuring the continuity of said pressure face or any one of a number of deployed positions, for which said at least one deflector is turned with its rear part projecting from said pressure face recess, thus giving the trailing edge of said aerodynamic surface a parametrizable variable thickness.

2. The aerodynamic surface as claimed in claim 1, wherein the chord of said at least one deflector is at most equal to three hundredths of the chord of said aerodynamic surface.

3. The aerodynamic surface as claimed in claim 1, wherein when said at least one deflector is in the retracted extreme position, the rear edge thereof is aligned with the rear edge of said trailing edge base.

4. The aerodynamic surface as claimed in claim 1, wherein when said at least one deflector is in the retracted position, the rear edge thereof projects with respect to the edge of said trailing edge base.

5. The aerodynamic surface as claimed in claim 1, wherein said pressure face recess and said at least one deflector extend over most of the length of said trailing edge.

6. The aerodynamic surface as claimed in claim 1, wherein said recess and said at least one deflector extend over a limited portion of the length of said trailing edge.

7. The aerodynamic surface as claimed in claim 6, wherein it comprises several deflectors of limited length, arranged along said trailing edge.

8. The aerodynamic surface as claimed in claim 1, wherein said actuating means impart a fixed angular turning to said at least one moving deflector.

9. The aerodynamic surface as claimed in claim 1, wherein said actuating means impart a fluctuating angular turning to said at least one moving deflector.

10. The aerodynamic surface as claimed in claim 9, wherein said fluctuating angular turning is dependent on the measurement form sensors spread along the reduced-pressure face of said aerodynamic surface and making it possible, at every instant, to locate the levels of intensity of any air flow separation over said surface.

11. The aerodynamic surface as claimed in claim 10, wherein said sensors measure pressures.

* * * * *